US012264693B2

(12) United States Patent
Kondo

(10) Patent No.: US 12,264,693 B2
(45) Date of Patent: Apr. 1, 2025

(54) SYSTEM FOR DETECTING OPERATION OF A FLUID PRESSURE ACTUATOR

(71) Applicant: CKD CORPORATION, Komaki (JP)

(72) Inventor: Takemoto Kondo, Komaki (JP)

(73) Assignee: CKD CORPORATION, Komaki (JP)

( * ) Notice: Subject to any disclaimer, the term of this patent is extended or adjusted under 35 U.S.C. 154(b) by 0 days.

(21) Appl. No.: 18/667,062

(22) Filed: May 17, 2024

(65) Prior Publication Data

US 2024/0401616 A1 Dec. 5, 2024

(30) Foreign Application Priority Data

May 30, 2023 (JP) ................................ 2023-088757

(51) Int. Cl.
*F15B 19/00* (2006.01)
*F15B 21/00* (2006.01)

(52) U.S. Cl.
CPC .............. *F15B 19/00* (2013.01); *F15B 21/00* (2013.01)

(58) Field of Classification Search
CPC ...... F15B 15/28; F15B 19/00; F15B 15/2838; F15B 2211/6336
See application file for complete search history.

(56) References Cited

U.S. PATENT DOCUMENTS 10,634,172 B2 * 4/2020 Fujiwara ............... F15B 19/005
2018/0094654 A1 * 4/2018 Fujiwara ............. F15B 15/2838

FOREIGN PATENT DOCUMENTS

DE 102019212873 A1 * 3/2020 .............. F15B 11/10
JP 2018-059549 A 4/2018

* cited by examiner

*Primary Examiner* — Abiy Teka
(74) *Attorney, Agent, or Firm* — Oliff PLC

(57) ABSTRACT

An operation detecting system for a fluid pressure actuator is provided with a first pressure sensor for detecting a first pressure value which is a pressure value in a first pressure acting chamber, a second pressure value which is pressure value in a second pressure acting chamber, and an operation detecting device including a detection program configured to calculate an addition value of the first pressure value and the second pressure value, calculate a time differential value of the addition value, and detect the start time and the stop time of movement of a piston based on a variation in the time differential value over time.

12 Claims, 8 Drawing Sheets

SYSTEM FOR DETECTING OPERATION OF A FLUID PRESSURE ACTUATOR

CROSS-REFERENCE TO RELATED APPLICATIONS

This application is based upon and claims the benefit of priority to Japanese Patent Application No. 2023-088757 filed on May 30, 2023, the entire contents of which are incorporated herein by reference.

BACKGROUND

Technical Field

The disclosure relates to a system for detecting the operations of a fluid pressure actuator.

Related Art

For example, for control of robot arms and air hands in food factories and others, fluid pressure actuators with double-acting cylinders are used. The interior of a fluid pressure actuator is divided into a first pressure acting chamber and a second pressure acting chamber by a piston, and one ends of pipes for supply/exhaust of operation air are each connected to a corresponding one of the pressure acting chambers. The other ends of the pipes are connected to a supply source of operation air via a changeover valve. The changeover valve is switched between air supply to the first pressure acting chamber and air supply to the second pressure acting chamber by the changeover valve, causing reciprocating motion of the piston inside the cylinder.

In the fluid pressure actuator mentioned above, for example, the operation of the fluid pressure actuator may be monitored to determine whether or not the actuator is operating normally by monitoring a time period from the start of supplying operation air to the start of moving the piston or by monitoring a time period from the start to the stop of the piston movement. In this case, it is important to accurately detect start and stop times of the piston movement.

In such circumstance, for example, Japanese unexamined patent application publication No. 2018-059549 (JP 2018-059549A) discloses a cylinder operating condition monitoring device capable of detecting the operating conditions of a piston by monitoring at least one of a time differential value of a pressure value in a first pressure acting chamber (a first pressure value) and a time differential value of a pressure value in a second pressure acting chamber (a second pressure value).

SUMMARY

Technical Problems

However, the foregoing related art has the following problems. For example, when the fluid pressure actuator is operated in a push direction, the time differential value of the first pressure value always varies or changes in a positive direction regardless of whether the piston starts or stops moving. Therefore, even if the start and the stop of piston movement are to be detected by observation of a variation in the time differential value of the first pressure value, it is difficult to determine whether the piston has started or stopped moving at the time when the time differential value of the first pressure value changes in the positive direction.

Further, the time differential value of the second pressure value always varies or changes in a negative direction regardless of whether the piston starts or stops moving. Therefore, even if the start and the stop of the piston movement are to be detected by observation of the variation in the time differential value of the second pressure value, it is difficult to determine whether the piston has started or stopped moving at the time when the time differential value of the second pressure value changes in the negative direction.

The present disclosure has been made to address the above problems and has a purpose to provide a system for detecting the operations of a fluid pressure actuator, configured to accurately detect the start and stop times of piston movement in the fluid pressure actuator.

Means of Solving the Problems

To achieve the above-mentioned purpose, one aspect of the present disclosure provides a system for detecting the operations of a fluid pressure actuator configured as below.

(1) In a system for detecting operation of a fluid pressure actuator, the fluid pressure actuator being provided with a double-acting cylinder having a piston and an interior divided by the piston into a first pressure acting chamber and a second pressure acting chamber, the fluid pressure actuator being configured to switch a moving direction of the piston by switching between supply of operation air to the first pressure acting chamber and supply of operation air to the second pressure acting chamber, wherein the system is configured to detect a start time at which the piston starts to move and a stop time at which the piston stops moving, the system comprises: a first pressure detecting unit configured to detect a first pressure value representing a pressure value in the first pressure acting chamber; a second pressure detecting unit configured to detect a second pressure value representing a pressure value in the second pressure acting chamber; and a detecting unit including a detection program configured to calculate an addition value of the first pressure value and the second pressure value, calculate a time differential value of the addition value, and detect the start time and the stop time based on a variation in the time differential value over time.

(2) In the fluid pressure actuator operation detecting system described in (1), the detection program may be configured to determine that a time point at which the time differential value having started changing from nearly zero to a positive value converges again to nearly zero is the start time.

(3) In the fluid pressure actuator operation detecting system described in (1) or (2), the detection program may be configured to determine that a time point at which the time differential value starts to change from nearly zero to a negative value is the stop time.

(4) In the fluid pressure actuator operation detecting system described in any one of (1) to (3), the detection program may be configured to determine that a time point at which the time differential value starts to change from nearly zero to a positive value is a time point at which the supply of operation air to the first pressure acting chamber and the supply of operation air to the second pressure acting chamber are switched over.

In a fluid pressure actuator, the moving direction of a piston is switched between a push direction and a pull direction by switching between the supply of operation air to a first pressure acting chamber and the supply of operation air to a second pressure acting chamber. For such an actuator, the inventor has found out that the start time and the stop time of piston movement can be accurately detected by time-differentiating a value (an addition value) obtained by adding up a first pressure value which is a pressure value in the first pressure acting chamber and a second pressure value which is a pressure value in the second pressure acting chamber, regardless of the piston moving direction, and monitoring a variation over time in the value obtained by the time differentiation. In the following description, the value obtained by time-differentiating an addition value, which is the sum of the first and second pressure values, is referred to as a "time differential value of the addition value", and the variation over time in the time differential value of the addition value is referred to as a "variation in the time differential value of the addition value".

For example, the inventor found that the time point at which the time differential value of the addition value, which has started varying or changing from nearly zero to a positive value, converges to nearly zero again (which is referred to as a convergence time point) coincides with the start time of piston movement. Thus, by monitoring the variation in the time differential value of the addition value, it is possible to accurately determine that the convergence time point is the start time of piston movement.

Further, for example, the inventor found that the time point at which the time differential value of an addition value starts to vary or change from nearly zero to a negative value (which is referred to as a negative variation start point) coincides with the stop time of piston movement. Thus, by monitoring the variation in the time differential value of the addition value, it is possible to accurately determine that the negative variation start point is the stop time of piston movement.

In addition, for example, the inventor found that the time point at which the time differential value of an addition value starts to vary or change from nearly zero to a positive value (which is referred to as a positive variation start point) coincides with a time point at which the operation air supply to the first pressure acting chamber and the operation air supply to the second pressure acting chamber are switched, which is referred to as air supply switching. Thus, by monitoring the variation in the time differential value of the addition value, it is possible to accurately determine that the positive variation start point is the time point at which air supply switching is performed. Note that the air supply switching is performed to change the moving direction of a piston of a fluid pressure actuator from a push direction to a pull direction or from the pull direction to the push direction. In a fluid pressure actuator provided with an operation rod connected to a piston, the push direction indicates the direction in which the operation rod is projected from a double-acting cylinder, and the pull direction indicates the direction in which the operation rod is retracted into the double-acting cylinder, opposite the push direction.

(5) In the fluid pressure actuator operation detecting system described in any one of (1) to (4), the detection program may be configured to calculate a subtraction value between the first pressure value and the second pressure value, calculate a time differential value of the subtraction value, and detect the moving direction of the piston based on a variation in the time differential value over time.

(6) In the fluid pressure actuator operation detecting system described in (5), the detection program may be configured to detect the moving direction of the piston at the time when detecting the variation in the time differential value of the addition value.

In the variation in the time differential value of the addition value in (1) to (4) mentioned above, regardless of whether the fluid pressure actuator operates in the push direction or in the pull direction, the convergence time point after the positive variation start point is the start time of piston movement and the negative variation start point is the stop time of piston movement. Therefore, it is difficult to determine whether the fluid pressure actuator is operating in the push direction or in the pull direction only by monitoring the variation in the time differential value of the addition value. Under such circumstances, the inventor found out that whether the fluid pressure actuator is operating in the push direction or the pull direction could be discriminated by performing a subtraction between the first and second pressure values, time-differentiating a value obtained by the subtraction (i.e., a subtraction value), and monitoring a variation over time in a value obtained by the time differentiation. The value obtained by the time differentiation of the value calculated by the subtraction between the first and second pressure values is referred to as a "time differential value of the subtraction value" and the variation over time in the time differential value of the subtraction value is referred to as a "variation in the time differential value of the subtraction value".

For example, the inventor found out that when the fluid pressure actuator operates in the push direction, the time differential value of the subtraction value changes from nearly zero to a positive value at the time point of switching air supply and the stop time of piston movement. Further, for example, the inventor also found that when the fluid pressure actuator operates in the pull direction, the time differential value of the subtraction value changes from nearly zero to a negative value at the time point of switching air supply and the stop time of piston movement.

Therefore, by monitoring the variation in the time differential value of the subtraction value in combination with monitoring the variation in the time differential value of the addition value, it is possible to determine whether the fluid pressure actuator starts operating in the push direction or in the pull direction based on whether the time differential value of the subtraction value has already changed to a positive value or a negative value at the timing of the convergence time point of the variation in the time differential value of the addition value. In addition, it is possible to determine whether the fluid pressure actuator completes the operation in the push direction or in the pull direction based on whether the time differential value of the subtraction value has already changed to a positive value or a negative value at the timing of the negative variation start point of the variation in the time differential value of the addition value.

The fluid pressure actuator operation detecting system of the disclosure configured as above can accurately detect the start time and the stop time of movement of a piston in a fluid pressure actuator.

DETAILED DESCRIPTION OF THE EXEMPLARY EMBODIMENTS

A detailed description of a system 1 for detecting operations of a fluid pressure actuator, which will be referred below to simply as an "operation detecting system 1", in an embodiment of this disclosure will now be given referring to the accompanying drawings. The operation detecting system 1 is configured to detect an operating state of a fluid pressure actuator 10.

Fluid Pressure Actuator

Figure 1:
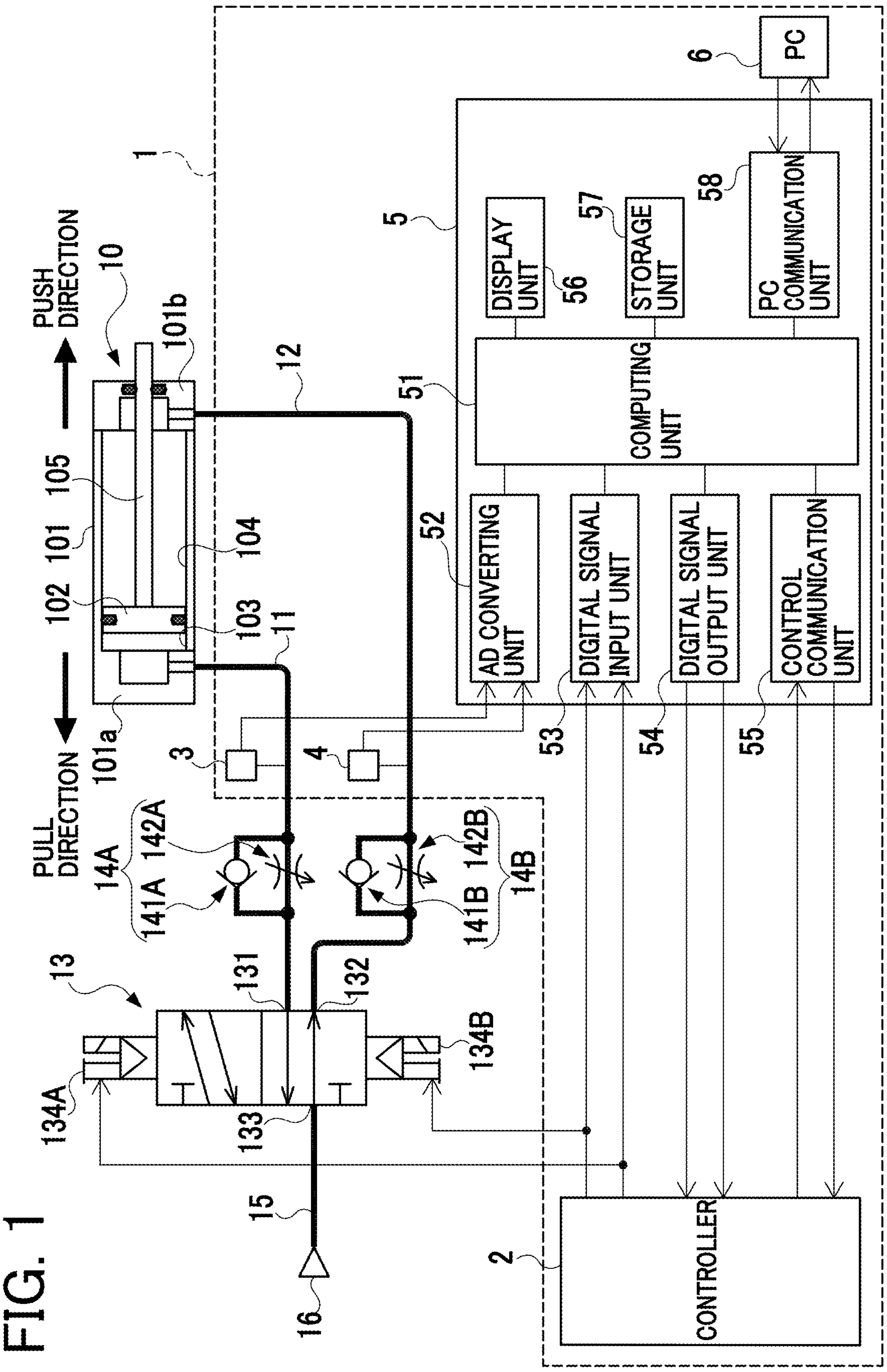
FIG. 1 is a schematic configuration diagram of an operation detecting system in an embodiment.

The configuration of the fluid pressure actuator 10 will be described first. This actuator 10 is mainly constituted of a double-acting cylinder 101, a piston 102, and an operating rod 105 as shown in FIG. 1.

The piston 102 is slidably held inside the double-acting cylinder 101. The sliding direction of the piston 102 is for example along a longitudinal direction of the double-acting cylinder 101, which is a lateral direction in FIG. 1. The piston 102 is placed to divide the interior of the double-acting cylinder 101 into a first pressure acting chamber 103 and a second pressure acting chamber 104, which will be also simply referred to as a first chamber 103 and a second chamber 104 respectively. Furthermore, the operating rod 105 is connected to the end face of the piston 102 on the side facing the second chamber 104. This operating rod 105 extends out of the double-acting cylinder 101 by passing through one of end portions of the double-acting cylinder 101 in its longitudinal direction, located on the second chamber 104 side, i.e., a second end portion 101*b*.

To the other end portion of the double-acting cylinder 101 in the longitudinal direction, located on the first chamber 103 side, i.e., a first end portion 101*a*, one end of a first pipe 11 is connected for supply or exhaust of operation air. The first pipe 11 connected to the first end portion 101*a* is communicated with the first chamber 103 through an internal flow channel of the double-acting cylinder 101. The other end of the first pipe 11 is connected to a first connection port 131 of a changeover valve 13.

To the second end portion 101*b* of the double-acting cylinder 101, one end of a second pipe 12 is connected for supply or exhaust of operation air. The second pipe 12 connected to the second end portion 101*b* is communicated with the second chamber 104 through an internal flow channel of the double-acting cylinder 101. The other end of the second pipe 12 is connected to a second connection port 132 of the changeover valve 13.

A flow regulating unit 14A including a check valve 141A and a flow regulating valve 142A is provided on the first pipe 11. A flow regulating unit 14B including a check valve 141B and a flow regulating valve 142B is provided on the second pipe 12.

The changeover valve 13 has an input port 133 through which operation air enters in the changeover valve 13. This input port 133 is connected to one end of an air supply pipe 15, while the other end of the air supply pipe 15 is connected to a supply source 16 of operation air.

The changeover valve 13 is a double solenoid type electromagnetic valve, including a first solenoid 134A and a second solenoid 134B. These solenoids 134A and 134B are electrically connected to a controller 2 mentioned later. Therefore, the controller 2 can give an electric signal to the first solenoid 134A or the second solenoid 134B, thereby driving a valve element (not shown) arranged in the changeover valve 13. The details thereof will be described below.

When an electric signal is given to the first solenoid 134A, the valve element of the changeover valve 13 is attracted toward the first solenoid 134A. The input port 133 is thus brought into communication with the first connection port 131, while the second connection port 132 is brought into communication with the outside of the changeover valve 13.

When the input port 133 and the first connection port 131 are in communication with each other, the operation air supplied from the supply source 16 to the changeover valve 13 is output to the first pipe 11 through the first connection port 131. The operation air output to the first pipe 11 is allowed to flow through the first pipe 11 and supplied to the first chamber 103 of the double-acting cylinder 101.

When the operation air is supplied to the first chamber 103, the pressure in this first chamber 103 increases, pushing the piston 102. Accordingly, the piston 102 is moved toward the second end portion 101*b*. As the piston 102 moves toward the second end portion 101*b*, i.e., in the push direction, the operation air having been supplied to the second chamber 104 is exhausted from the second chamber 104. The operation air exhausted from the second chamber 104 then flows in the changeover valve 13 through the second pipe 12 and the second connection port 132. At that time, since the second connection port 132 is in communication with the outside of the changeover valve 13, the operation air flowing in the changeover valve 13 is exhausted to the outside.

In contrast, when an electrical signal is given to the second solenoid 134B, the valve element of the changeover valve 13 is attracted toward the second solenoid 134B. The input port 133 is thus brought into communication with the second connection port 132, while the first connection port 131 is brought into communication with the outside of the changeover valve 13.

When the input port 133 and the second connection port 132 are in communication with each other, the operation air supplied from the supply source 16 to the changeover valve 13 is output to the second pipe 12 through the second connection port 132. The operation air output to the second pipe 12 is allowed to flow through the second pipe 12 and supplied to the second chamber 104 of the double-acting cylinder 101.

When operation air is supplied to the second chamber 104, the pressure in this second chamber 104 increases, pushing the piston 102. Accordingly, the piston 102 is moved toward the first end portion 101*a*, i.e., in the pull direction. As the piston 102 moves toward the first end portion 101*a*, the operation air having been supplied to the first chamber 103 is exhausted from the first chamber 103. The operation air exhausted from the first chamber 103 then flows in the changeover valve 13 through the first pipe 11 and the first connection port 131. At that time, since the first connection port 131 is in communication with the outside of the changeover valve 13, the operation air flowing in the changeover valve 13 is exhausted to the outside.

When the electric signal is given to the first solenoid 134A or the second solenoid 134B, thereby driving the valve element of the changeover valve 13 as described above, the supply of operation air to the first chamber 103 and the supply of operation air to the second chamber 104 can be switched. This operation will also be simply referred to as "air supply switching". By repeating the air supply switching, the piston 102 can perform reciprocating movement. The reciprocating movement of the piston 102 causes the operating rod 105 connected to the piston 102 to reciprocate together. When the piston 102 is moved toward the second end portion 101*b*, the operating rod 105 is driven to project from the double-acting cylinder 101. To the contrary, when the piston 102 is moved toward the first end portion 101*a*, the operating rod 105 is driven to retract into the double-acting cylinder 101. Driving the operating rod 105 to project from the double-acting cylinder 101 is referred to as the push-direction driving, whereas driving the operating rod 105 to retract into the double-acting cylinder 101 is referred to as the pull-direction driving.

The operating speed of the operating rod 105 in reciprocating movement is controlled by regulation of a flow rate of operation air by the flow regulating units 14A and 14B. The details thereof will be described below.

For example, when the operating speed of the operating rod 105 is to be controlled by regulating a flow rate of operation air to be exhausted from the first chamber 103 or the second chamber 104 (Meter-out control), the check valve 141A of the flow regulating unit 14A and the check valve 141B of the flow regulating unit 14B are configured to allow operation air to flow from the changeover valve 13 side toward the fluid pressure actuator 10, while blocking the operation air from flowing in an opposite direction.

To drive the operating rod 105 in the push direction, the operation air is supplied to the first chamber 103 through the first pipe 11. In this case, the check valve 141A of the flow regulating unit 14A on the first pipe 11 allows a flow of the operation air toward the first chamber 103, so that the operation air is supplied to the first chamber 103. As the piston 102 is moved in the push direction, the operation air in the second chamber 104 is exhausted out into the second pipe 12. At that time, the operation air is blocked from passing through the check valve 141B of the flow regulating unit 14B on the second pipe 12 and therefore passes through the flow regulating valve 142B. The flow rate of this operation air is thus adjusted according to the valve opening degree of the flow regulating valve 142B, and hence the moving speed of the piston 102 in the push direction is controlled, that is, the moving speed of the operating rod 105 in the push direction is controlled.

Conversely, to drive the operating rod 105 in the pull direction, operation air is supplied to the second chamber 104 through the second pipe 12. In this case, the check valve 141B of the flow regulating unit 14B on the second pipe 12 allows a flow of operation air toward the second chamber 104, so that the operation air is supplied to the second chamber 104. As the piston 102 is moved in the pull direction, the operation air in the first pressure 103 is exhausted out into the first pipe 11. At that time, the operation air is blocked from passing through the check valve 141A of the flow regulating unit 14A on the first pipe 11 and therefore passes through the flow regulating valve 142A. The flow rate of this operation air is thus adjusted according to the valve opening degree of the flow regulating valve 142A, and hence the moving speed of the piston 102 in the pull direction is controlled, that is, the moving speed of the operating rod 105 in the pull direction is controlled.

In contrast, for example, when the operating speed of the operating rod 105 is to be controlled by regulating a flow rate of operation air to be supplied to the first chamber 103 or the second chamber 104 (Meter-in control), the check valve 141A of the flow regulating unit 14A and the check valve 141B of the flow regulating unit 14B are configured to allow operation air to flow from the fluid pressure actuator 10 side toward the changeover valve 13, while blocking the operation air from flowing in an opposite direction.

To drive the operating rod 105 in the push direction, the operation air is supplied to the first chamber 103 through the first pipe 11. In this case, the operation air is blocked from passing through the check valve 141A of the flow regulating unit 14A on the first pipe 11 and thus is supplied to the first chamber 103 by passing through the flow regulating valve 142A. The flow rate of this operation air is thus adjusted according to the valve opening degree of the flow regulating valve 142A, and hence the moving speed of the piston 102 in the push direction is controlled, that is, the moving speed of the operating rod 105 in the push direction is controlled. As the piston 102 is moved in the push direction, the operation air in the second chamber 104 is exhausted out into the second pipe 12. At that time, the check valve 141B of the flow regulating unit 14B on the second pipe 12 allows a flow of the operation air to flow toward the changeover valve 13.

Conversely, to drive the operating rod 105 in the pull direction, operation air is supplied to the second chamber 104 through the second pipe 12. In this case, the operation air is blocked from passing through the check valve 141B of the flow regulating unit 14B on the second pipe 12, so that the operation air passes through the flow regulating valve 142B and is supplied to the second chamber 104.

Consequently, the flow rate of the operation air is adjusted according to the valve opening degree of the flow regulating valve 142B, and hence the moving speed of the piston 102 in the pull direction is controlled, that is, the moving speed of the operating rod 105 in the push direction is controlled. As the piston 102 is moved in the pull direction, the operation air in the first pressure 103 is exhausted out into the first pipe 11. At that time, the check valve 141A of the flow regulating unit 14A on the first pipe 11 allows the operation air to flow toward the changeover valve 13.

Operation Detecting System

The configuration of the operation detecting system 1 will be described below. The operation detecting system 1 is mainly constituted of the controller 2, a first pressure sensor 3 (one example of a first pressure detecting unit), a second pressure sensor 4 (one example of a second pressure detecting unit), and an operation detecting device 5 (one example of a detecting unit).

The controller 2 gives an electric signal to the first solenoid 134A or the second solenoid 134B to switch air supply and hence control the operation of the fluid pressure actuator 10.

The first pressure sensor 3 is placed on the first pipe 11, between the flow regulating unit 14A and the fluid pressure actuator 10. This first pressure sensor 3 detects a pressure value in the first pipe 11. This corresponds to detecting a pressure value in the first pressure acting chamber 103 (a first pressure value). This is because a uniform pressure is applied over the inner wall of the first chamber 103 and the inner wall of the first pipe 11 communicating with the first chamber 103 due to Pascal's principle.

Further, the second pressure sensor 4 is placed on the second pipe 12, between the flow regulating unit 14B and the fluid pressure actuator 10. This second pressure sensor 4 detects a pressure value in the second pipe 12. This corresponds to detecting a pressure value in the second pressure acting chamber 104 (a second pressure value). This is because a uniform pressure is applied over the inner wall of the second chamber 104 and the inner wall of the second pipe 12 communicating with the second chamber 104.

The operation detecting device 5 is provided with a computing unit 51, and further an AD converting unit 52, a digital signal input unit 53, a digital signal output unit 54, a control communication unit 55, a display unit 56, a storage unit 57, and a PC communication unit 58 which are electrically connected to the computing unit 51.

The computing unit 51 detects, according to a detection program, an operating state of the fluid pressure actuator 10 based on the information input to the operation detecting device 5 from the pressure sensors 3 and 4, and the controller 2.

The AD converting unit 52 is electrically connected to the first pressure sensor 3 and the second pressure sensor 4. The first pressure sensor 3 and the second pressure sensor 4 output analog signals representing detected pressure values (i.e., the first pressure value and the second pressure value). These analog signals are converted into digital signals by the AD converting unit 52 and transmitted as first and second pressure value data to the computing unit 51. Upon receipt of the data, the computing unit 51 runs the detection program to detect an operating state of the fluid pressure actuator.

The digital signal input unit 53 is electrically connected to the controller 2, and thus the electric signal given to the first solenoid 134A or the second solenoid 134B by the controller 2 is branched and input to the digital signal input unit 53. This enables the operation detecting device 5 to ascertain the point of time at which the electric signal is given to the first solenoid 134A or the second solenoid 134B, i.e., time t1 and time t5 (see FIG. 8).

The digital signal output unit 54 is electrically connected to the controller 2 and outputs, to the controller 2, electric signals representing the operating state of the piston 102 and the time point at which the air supply switching is performed by the changeover valve 13, determined by the computing unit 51. Upon receipt of this output, the controller 2 can notify the state to a user of the operation detecting system 1 and to a higher-level controller (not shown). For example, the controller 2 can notify it to the user by lighting of a revolving warning light or the like or to a higher-level controller can control another device.

The control communication unit 55 is electrically connected to the controller 2 and can receive setting values such as model information, specifications, and operating conditions of the fluid pressure actuator 10 and the changeover valve 13. Further, the control communication unit 55 outputs the operating times of the fluid pressure actuator 10 and the changeover valve 13, which are calculated in the computing unit 51, to the controller 2. When receiving those outputs, the controller 2 can notify the state to a user of the operation detecting system 1 and further to a higher-level controller (not shown). For example, the controller 2 can notify the information, such as the variation amount of the operating time.

The display unit 56 is, for example, an LED or the like and can indicate the operating state of the fluid pressure actuator 10 according to the operating state of the piston 102 and the time point at which the air supply switching is performed in the changeover valve 13, which have been determined by the computing unit 51.

The storage unit 57 stores the detection program, and further can store the calculation results of the computing unit 51 and setting values of the operation detecting device 5. The setting values defined herein are parameters that influence absolute values of variation amounts of time differential values, such as the diameter of the piston 102, the stroke length and the diameter of the operating rod 105, the diameter and the length of the double-acting cylinder 101, and the effective cross-sectional area of the changeover valve 13. Further, the PC communication unit 58 can provide data communication between the operation detecting device 5 and an electronic computer (PC6) connected to the operation detecting device 5, and can output, for example, the operating state of the fluid pressure actuator 10 detected by the operation detecting device 5, and waveforms shown in FIG. 2 to FIG. 8 which will be described later, to the PC6.

Operations of the Detection Program

The operation detecting system 1 configured as above detects the operating state of the fluid pressure actuator 10 based on the first and second pressure values according to the detection program. To be specific, the system 1 detects the start time at which the piston 102 starts to move, the stop time at which the piston 102 stops moving, and the moving direction of the piston 102, i.e., whether the piston 102 is moving in the push direction or the pull direction.

The following description is given to an example where the fluid pressure actuator 10 is operated in the push direction. Just before the fluid pressure actuator 10 is operated in the push direction, for example, this actuator 10 is in a state where it has completed the operation in the pull direction, that is, the piston 102 is located on the side close to the first end portion 101*a* of the double-acting cylinder 101, and also the changeover valve 13 is receiving an electric signal to the second solenoid 134B.

To cause the fluid pressure actuator 10 to operate in the push direction, an electric signal is applied to the first solenoid 134A of the changeover valve 13 and simultaneously the electric signal to the second solenoid 134B is stopped (time t1 (see FIG. 8)). Thus, air supply is switched (time t2 (see FIG. 2)). Specifically, the supply of operation air to the second chamber 104 is switched over to the supply of operation air to the first chamber 103. This switching causes the second chamber 104 to start exhaust of the operation air. Then, the fluid pressure actuator 10 (i.e., the piston 102) begins to operate in the push direction.

Figure 2:
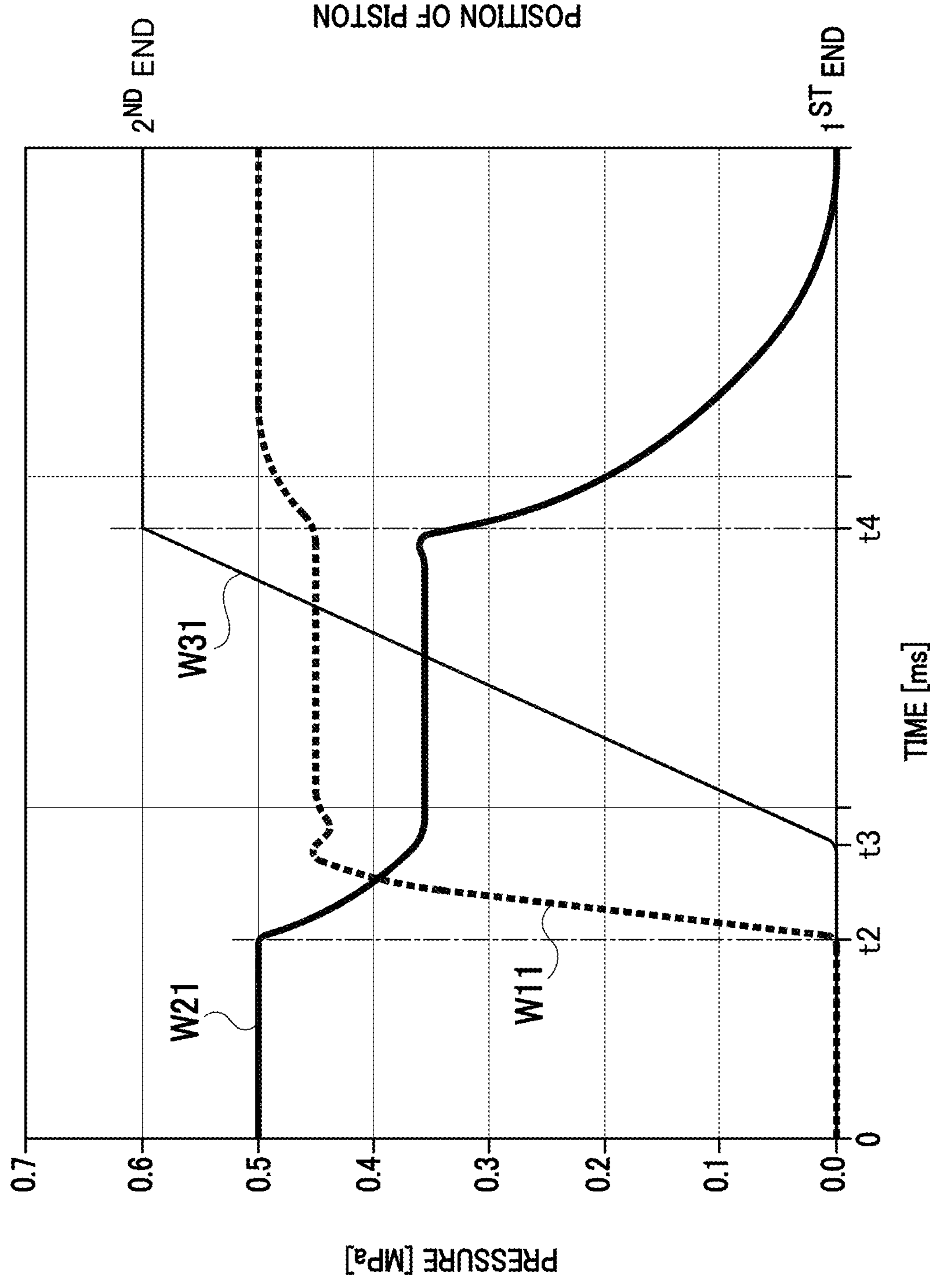
FIG. 2 is a graph showing a variation over time in a first pressure value and a second pressure value when a fluid pressure actuator is operated in a push direction.
Figure 6:
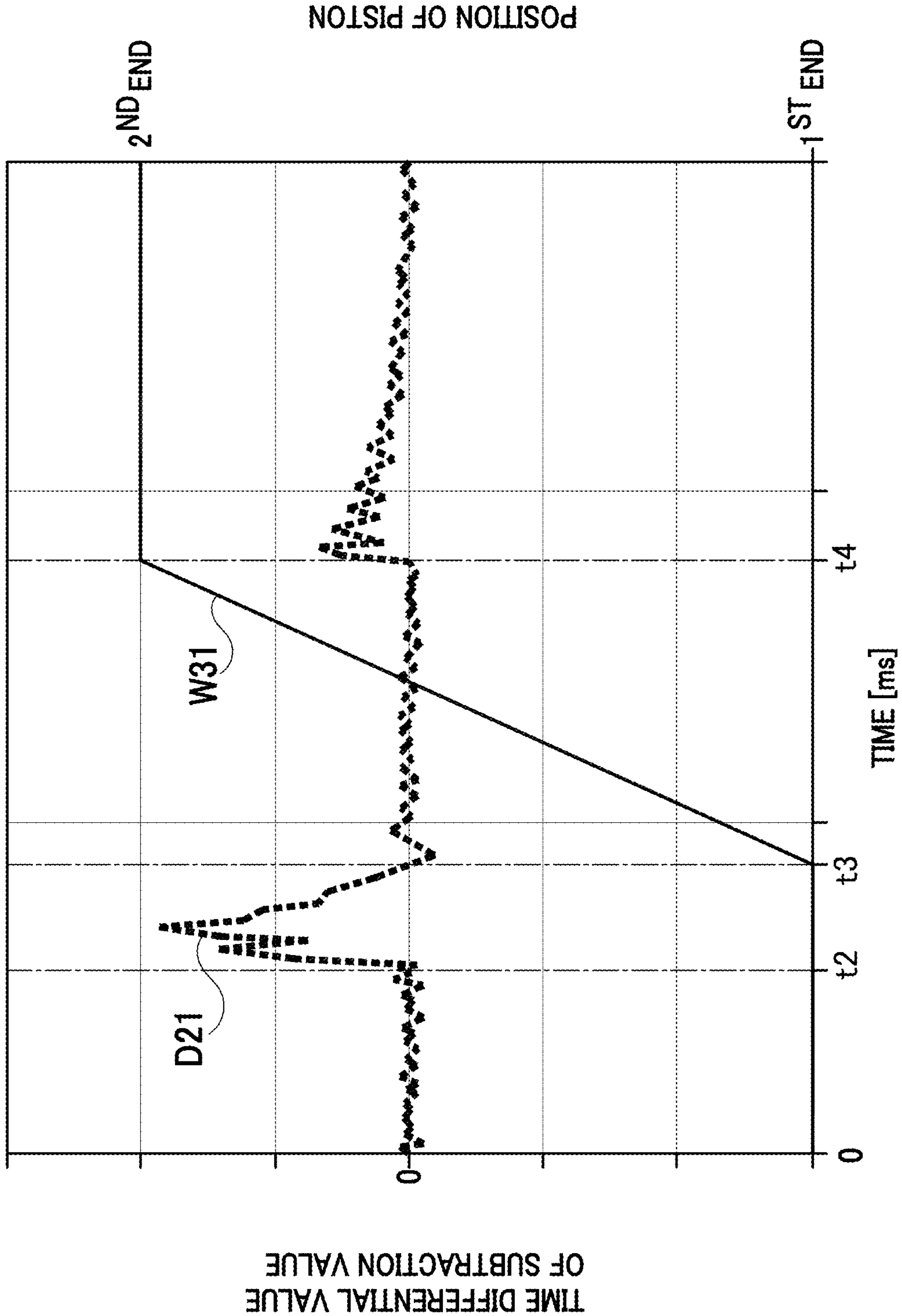
FIG. 6 is a graph showing a variation over time in a time differential value obtained by time-differentiating the subtraction value between the first and second pressure values when the fluid pressure actuator is operated in the push direction.
Figure 7:
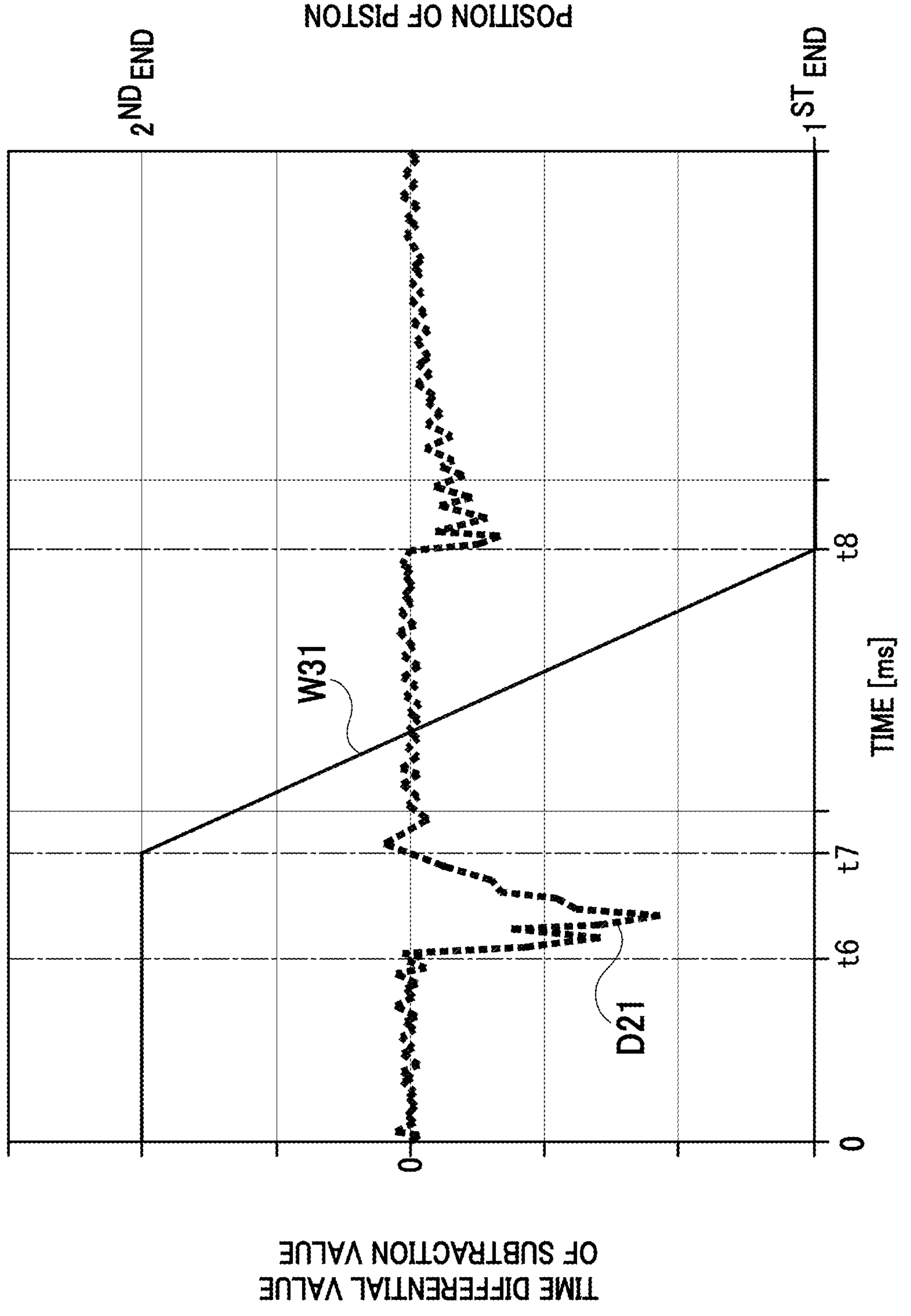
FIG. 7 is a graph showing a variation over time in time differential values obtained by time-differentiating the subtraction value between the first and second pressure values when the fluid pressure actuator is operated in a pull direction.

FIG. 2 is a graph showing a variation over time in the first and second pressure values detected respectively by the pressure sensors 3 and 4 when the fluid pressure actuator 10 is operated in the push direction. In FIG. 2, a waveform W11 shown by a broken line indicates the variation in the first pressure value over time and a waveform W21 shown by a thick solid line indicates the variation in the second pressure value over time. A waveform W31 shown by a thin solid line indicates the position of the piston 102. In FIG. 2, the term "$1^{st}$ end" represents the first end portion 101*a* and the term "$2^{nd}$ end" represents the second end portion 101*b* of the double-acting cylinder 101. In other words, the waveform W31 shows that the piston 102 moves from the first end portion 101*a* side to the second end portion 101*b* side as time passes. The same applies to the waveform W31 shown in each of FIG. 3 to FIG. 6. Further, the terms "$1^{st}$ end" and "$2^{nd}$ end" in FIG. 7 also represent the same meanings as above, and the waveform W31 in FIG. 7 shows that the piston 102 moves from the second end portion 101*b* side to the first end portion 101*a* side as time passes. Note that the position of the piston 102 (the waveform W31) shown in FIG. 2 is not detected by the operation detecting system 1 and is detected if a magnetostrictive sensor is provided to the fluid pressure actuator 10. The piston position (the waveform W31) detected by the magnetostrictive sensor is also plotted in FIG. 2 to facilitate the description. The same applies to the waveforms W31 shown in FIGS. 3 to 7.

As shown in FIG. 2, at time t2, the first pressure value starts to increase and the second pressure value starts to decrease. This is because air supply is switched, starting supply of air to the first pressure acting chamber 103 and exhaust of air from the second pressure acting chamber 104. At time t3, the piston 102 starts to move from the first end portion 101*a* side toward the second end portion 101*b*. Around this time t3, the first and second pressure values settle at approximately constant values. At time t4, subsequently, the piston 102 reaches the second end portion 101*b* and stops moving. Then, the first pressure value further increases and the second pressure value further decreases.

To detect the start time and the stop time of the movement of the piston 102, the detection program adds up the first and second pressure values varying as shown in FIG. 2 and further time-differentiates a value obtained by adding up the first and second pressure values, i.e., the sum of those pressure values.

Figure 3:
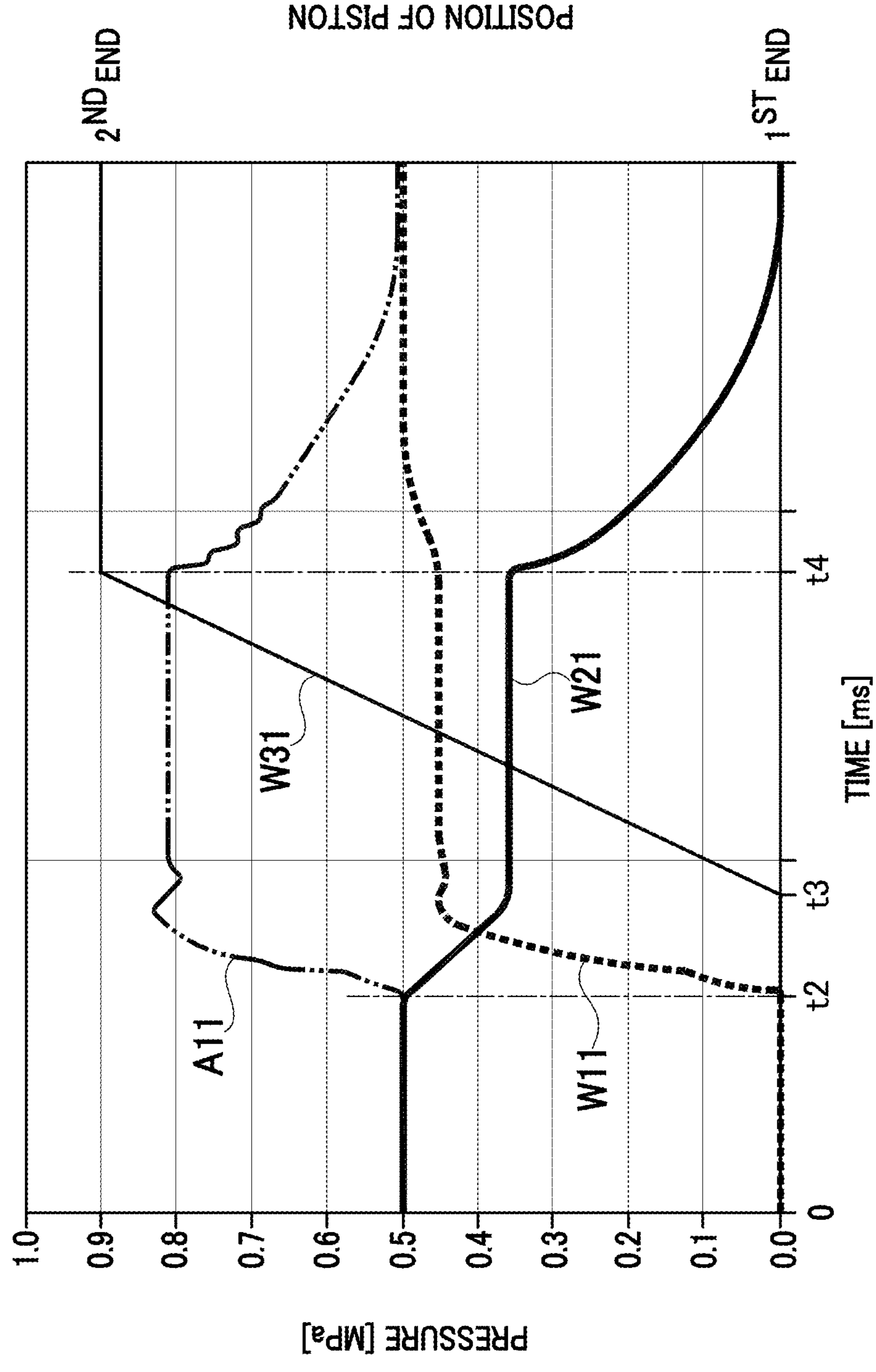
FIG. 3 is a graph showing a variation over time in a value obtained by adding the first and second pressure values when the fluid pressure actuator is operated in the push direction.

FIG. 3 is a graph showing a variation over time in a value obtained by adding up the first and second pressure values, hereinafter simply referred to as an "addition value". In FIG. 3, a waveform W11 shown by a broken line indicates the variation in the first pressure value over time as in FIG. 2. In FIG. 3, furthermore, a waveform W21 shown by a thick solid line indicates the variation in the second pressure value over time as in FIG. 2, a waveform W31 shown by a thin solid line indicates the position of the piston 102 as in FIG. 2, and a waveform A11 shown by a two-dot chain line indicates the variation in an addition value over time. This addition value is the sum of pressure values detected by the first pressure sensor 3 and the second pressure sensor 4 at the same time point.

Figure 4:
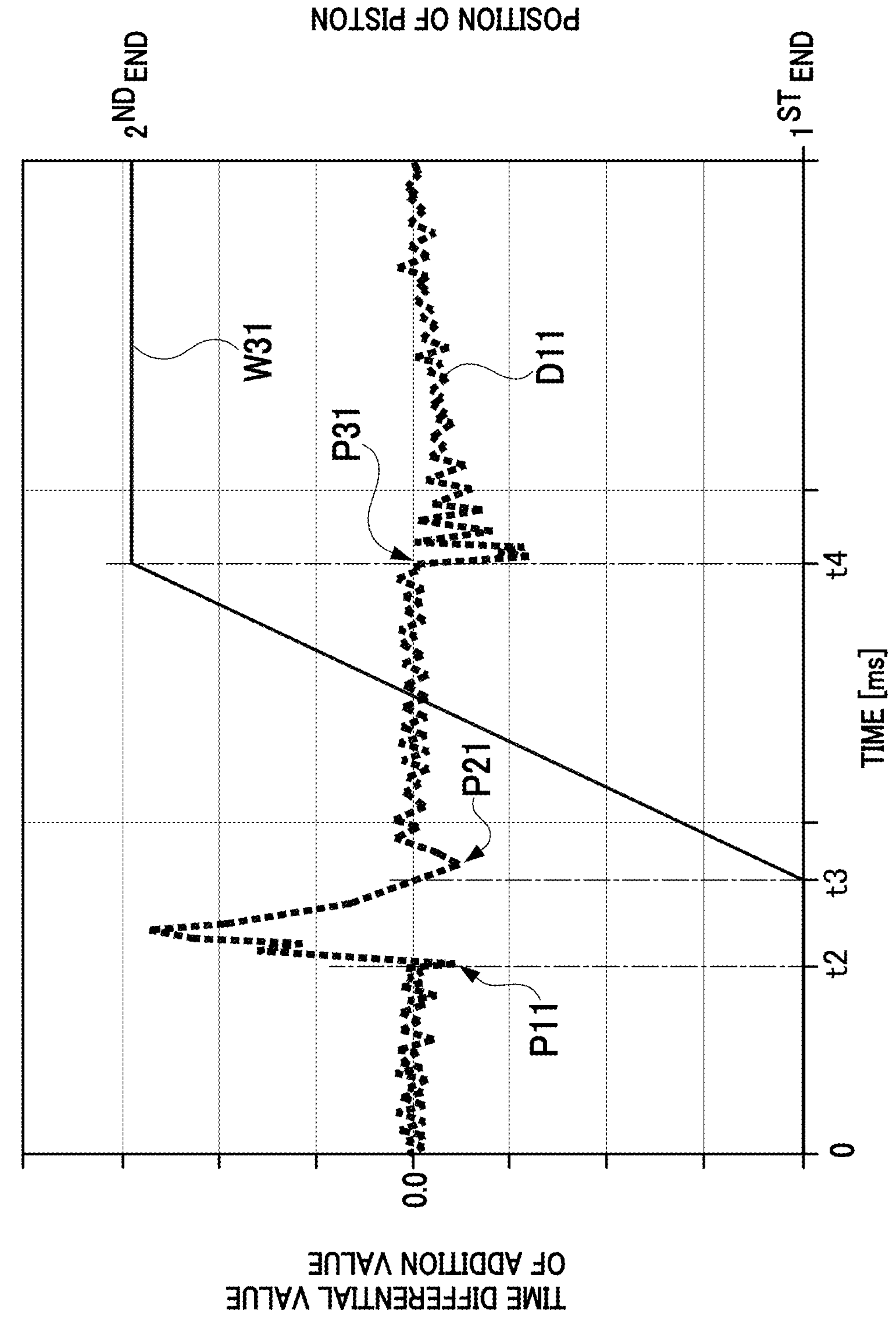
FIG. 4 is a graph showing a variation over time in a time differential value obtained by time-differentiating the addition value of the first and second pressure values when the fluid pressure actuator is operated in the push direction.

The detection program further performs time differentiation of the addition values. FIG. 4 is a graph showing a variation over time in a value obtained by time-differentiating the addition value, which will be simply referred to as a "time differential value of the addition value". In FIG. 4, a waveform D11 shown by a thick broken line indicates the variation in the time differential value, and a waveform W31 shown with a thin solid line indicates the position of the piston 102 as in FIGS. 2 and 3.

As shown in FIG. 4, the time point at which the time differential value of the addition value starts to change to a positive value (a positive variation start point P11) coincides with the time t2 at which air supply is switched. The time point at which the time differential value of the addition value having started changing to a positive value converges to nearly zero again (a convergence time point P21) coincides with the start time of movement of the piston 102 (time t3). Still further, the time point at which the time differential value of the addition value starts to change to a negative value (a negative variation start point P31) coincides with the stop time of movement of the piston 102 (time t4). Accordingly, the detection program can accurately detect the time t2 at which air supply is switched, the start time (time t3) at which the piston 102 starts to move, and the stop time (time t4) at which the piston 102 stops moving by calculating the time differential values of the addition values and further monitoring the time differential values of the addition values to detect the positive variation start point P11, the convergence time point P21, and the negative variation start point P31.

The above description is made about the example where the fluid pressure actuator 10 is operated in the push direction. Also in another example where the fluid pressure actuator 10 is operated in the pull direction, similarly, it is possible to accurately detect the start time and the stop time of movement of the piston 102 by monitoring variation in values obtained by time-differentiating addition values obtained by adding up of the first and second pressure values. This case will be described more specifically.

Just before the fluid pressure actuator 10 is operated in the pull direction, for example, this actuator 10 is in a state where it has completed the operation in the push direction, that is, the piston 102 is located on the side close to the second end portion 101*b* of the double-acting cylinder 101, and also the changeover valve 13 is receiving an electric signal to the first solenoid 134A.

To cause the fluid pressure actuator 10 to operate in the pull direction, an electric signal is applied to the second solenoid 134B of the changeover valve 13 and simultaneously the electric signal to the first solenoid 134A is stopped (time t5 (see FIG. 8)). Thus, air supply is switched (time t6 (see FIG. 8)). Specifically, the supply of operation air to the first chamber 103 is switched over to the supply of operation air to the second chamber 104. This switching causes the first chamber 103 to start exhaust of the operation air. Then, the fluid pressure actuator 10 (the piston 102) is operated in the pull direction.

Figure 8:
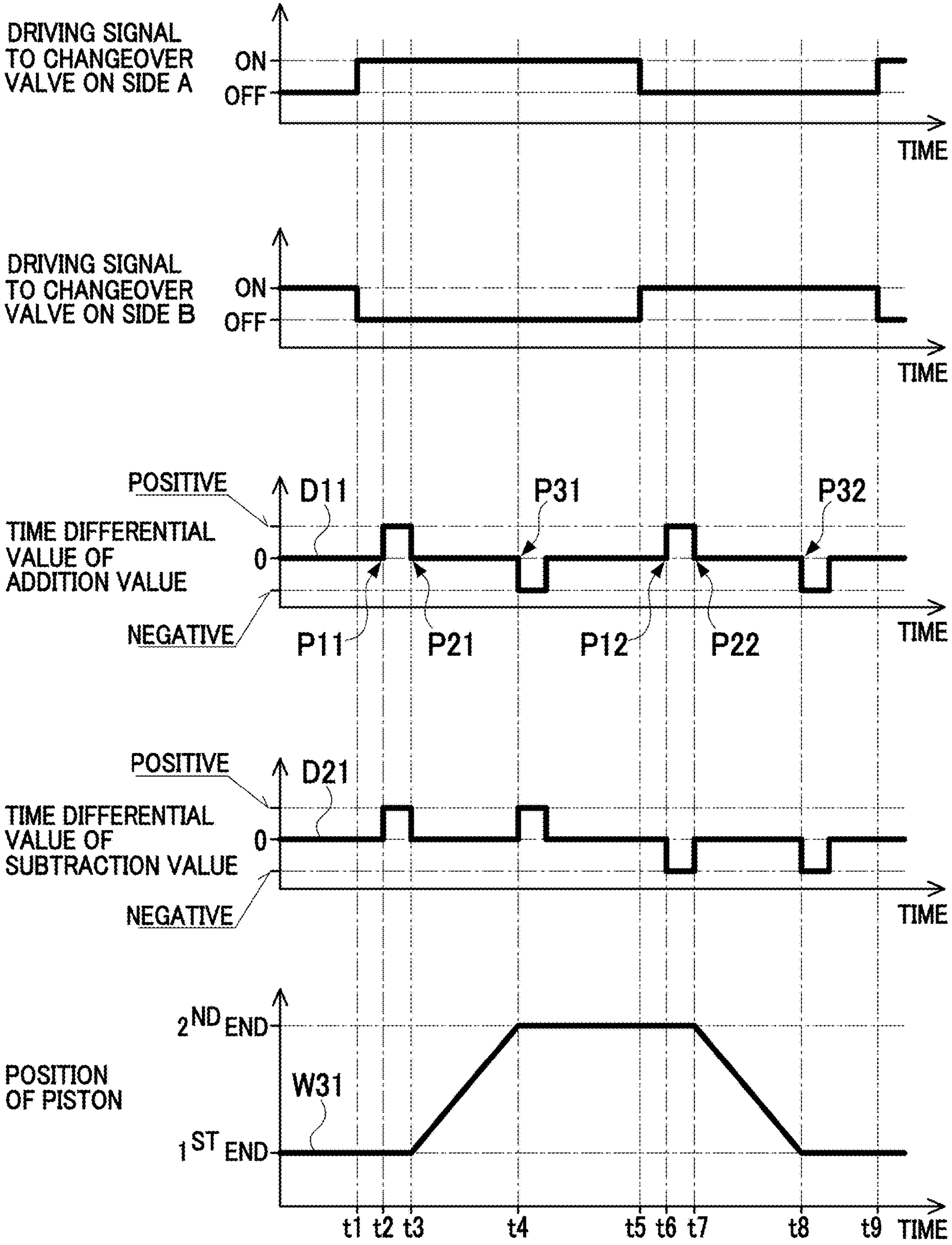
FIG. 8 is a graph showing monitoring of a time differential value of an addition value and a time differential value of a subtraction value by a detection device.

During the operations of the fluid pressure actuator 10 (the piston 102) in the pull direction, similarly to during the operation in the push direction, the time point at which the time differential value of the addition value starts to change to a positive value (a positive variation start point P12 (see FIG. 8)) coincides with the time point at which air supply is switched (see the time t6 in FIG. 8). Further, the time point at which the value having started changing to the positive value converges to nearly zero again (a convergence time point P22 (see FIG. 8)) coincides with the start time of movement of the piston 102 (see the time t7 in FIG. 8). Still further, the time point at which the time differential value starts to change from nearly zero to a negative value (a negative variation start point P32) coincides with the stop time of movement of the piston 102 (see the time t8 in FIG. 8). Accordingly, the detection program can accurately detect the time t6 at which the air supply is switched, the start time at which the piston 102 starts to move (time t7), and the stop time at which the piston 102 stops moving (time t8) by calculating the time differential values of the addition values and further monitoring the time differential values of the addition values to detect the positive variation start point P12, the convergence time point P22, and the negative variation start point P32.

Additionally, to detect whether the moving direction of the piston 102 is the push direction or the pull direction, when the variation in the time differential value of the addition value is detected, the detection program performs a subtraction between the first and second pressure values and further time-differentiates a subtraction value obtained from the subtraction. An example of operating the fluid pressure actuator 10 in the push direction will be described below.

Figure 5:
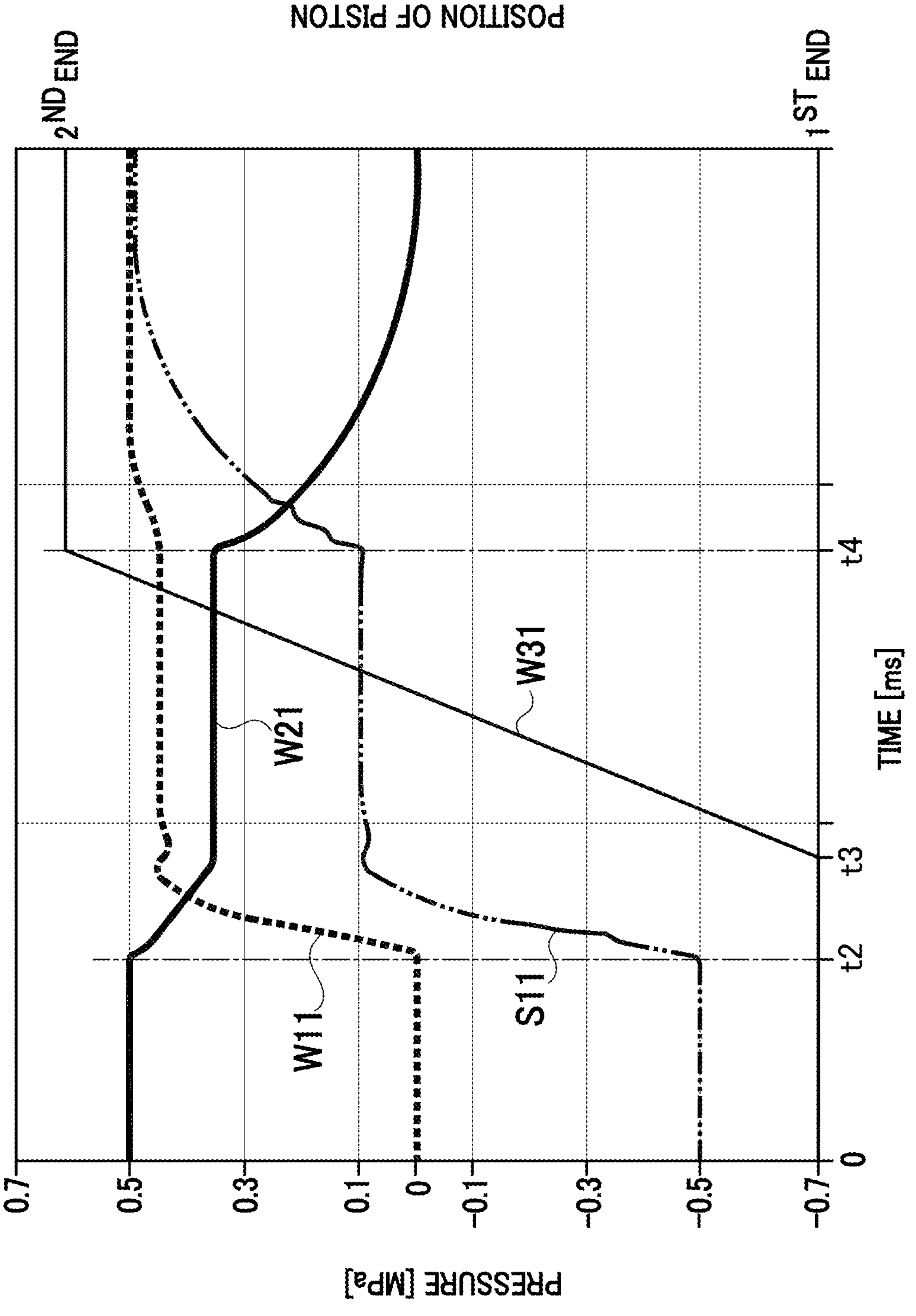
FIG. 5 is a graph showing a variation over time in a time differential value obtained by time-differentiating a value obtained by subtraction between the first pressure value and the second pressure value when the fluid pressure actuator is operated in the push direction.

FIG. 5 is a graph showing a variation over time in a value obtained by the subtraction between the first and second pressure values, which will be simply referred to as a "subtraction value". In FIG. 5, a waveform W11 shown by a broken line indicates a variation state of the first pressure value over time, a waveform W21 shown by a thick solid line similarly indicates a variation state of the second pressure value over time, and a waveform S11 shown by a two-dot chain line indicates a subtraction value of the first and second pressure values. The subtraction value is calculated using pressure values detected by the first pressure sensor 3 and the second pressure sensor 4 at the same time point, and obtained by subtracting the second pressure from the first pressure value.

Moreover, the detection program performs time differentiation of the subtraction value. FIG. 6 is a graph showing a variation over time in a value obtained by the time differentiation of the subtraction value, which will be referred to as a "time differential value of the subtraction value". In FIG. 6, a waveform D21 shown by a thick broken line indicates the variation in the time differential value, and a waveform W31 represents the position of the piston 102 as in FIG. 2 and other figures.

As shown in FIG. 6, the time differential value of the subtraction value starts to change from nearly zero to a positive value and then converges again to nearly zero during a period from the time point at which air supply is switched by the changeover valve 13 (time t2) to the start time at which the piston 102 starts to move (time t3). Further, this time differential value also changes from nearly zero to a positive value even at the stop time (time t4) at which the piston 102 stops moving.

Meanwhile, also in the case where the fluid pressure actuator 10 is operated in the pull direction, as in the above case, when the subtraction value of the first and second pressure values is time-differentiated, a value obtained by this time differentiation fluctuates as shown by a waveform D21 in FIG. 7. In FIG. 7, the time t6 is the time point at which air supply is switched by the changeover valve 13. The time differential value starts to change from nearly zero to a negative value and then converges to nearly zero during a period from the time point at which air supply is switched (time t6) to the start time at which the piston 102 starts to move (time t7). This time differential value also changes from nearly zero to a negative value at the stop time at which the piston 102 stops moving (time t8).

From the graphs in FIGS. 6 and 7, the following matters are revealed. Specifically, when the fluid pressure actuator 10 is operated in the push direction, the time differential value of the subtraction value varies in a positive direction according to the operation of the piston 102. When the fluid pressure actuator 10 is operated in the pull direction, the time differential value of the subtraction value varies in a negative direction according to the operation of the piston 102. Consequently, while monitoring the variation in the time differential value of the subtraction value in addition to monitoring the variation in the time differential value of the addition value, the detection program can determine whether the fluid pressure actuator 10 starts operating in the push direction or the pull direction based on whether the time differential value of the subtraction value has already changed to the positive value or to the negative value at the timings of the convergence time points P21 and P22 of the variation in the time differential value of the addition value. In addition, the detection program determine can determine whether the fluid pressure actuator 10 has completed the movement in the push direction or has completed the movement in the pull direction based on whether the time differential value of the subtraction value has already changed to a positive value or a negative value at the timings of the negative variation start points P31 and P32 of the variation in the time differential value of the addition value.

FIG. 8 is a graph showing the time differential value of the addition value and the time differential value of the subtraction value, which are monitored together as above. Each graph in FIG. 8 shows the following states. A graph labeled with "Driving signal to changeover valve on side A" shows an energized state (ON) of the first solenoid 134A to which an electric signal is being applied and a non-energized state (OFF) of the first solenoid 134A to which no electric signal is being applied. A graph labeled with "Driving signal to changeover valve on side B" shows an energized state (ON) of the second solenoid 134B to which an electric signal is being applied and a non-energized state (OFF) of the second solenoid 134B to which no electric signal is being applied. A graph labeled with "Time differential value of the addition value" shows a simplified time-variation in a time differential value of the value obtained by adding the first and second pressure values, i.e., the addition value. A graph labeled with "Time differential value of the subtraction value" shows a simplified time-variation in a time differential value of the value obtained by the subtraction between the first and second pressure values, i.e., the subtraction value. A graph labeled with "Position of piston" shows a change of the position of the piston 102 over time.

At time t1, the controller 2 applies an electric signal to the first solenoid 134A of the changeover valve 13. The operation detecting device 5 detects this timing at which the electric signal is applied to the first solenoid 134A, via the digital signal input unit 53.

Then, by monitoring the time differential value of the addition value, the detection program determines that the positive variation start point P11 corresponds to the time point at which air supply is switched by the changeover valve 13 (time t2). When the time period from time t1 to time t2 is calculated at the same time as the above determination, it is possible to judge if the operation of the changeover valve 13 is abnormal based on the length of the calculated time period. For example, if the calculated time period is longer than a predetermined threshold value (provided as a first threshold value), indicating that the changeover valve 13 is less responsive to switching of air supply after receiving the electric signal, the operation of the changeover valve 13 can be thus judged to be abnormal. If the changeover valve 13 is determined to be operating abnormally, the display unit 56 may display to that effect. The first threshold value is appropriately set for example according to parameters, such as how much responsiveness is required in the changeover valve 13 and the diameter of the piston 102 mentioned above.

Subsequently, by monitoring the time differential value of the addition value, the detection program determines that the convergence time point P21 of the time differential value corresponds to the start time of movement of the piston 102 (time t3). In addition, by monitoring the time differential value of the subtraction value, the detection program determines that the moving direction of the piston 102 is the push direction based on that the time differential value of the subtraction value has already changed to a positive value at the timing of convergence time point P21. The display unit 56 displays that the piston 102 starts moving and the moving direction is the push direction. Further, when the time period from time t2 to time t3 is calculated in addition to detecting the motion of the piston 102, it is possible to judge if the operation of the fluid pressure actuator 10 is abnormal based on the length of the calculated time period. For example, if the calculated time period is longer than a predetermined threshold value (provided as a second threshold value), indicating that the fluid pressure actuator 10 is less responsive to starting of the operation after the start of air supply, the operation of the fluid pressure actuator 10 can be thus judged to be abnormal. If the fluid pressure actuator 10 is determined to be operating abnormally, the display unit 56 may display to that effect. The second threshold value is appropriately set for example according to parameters, such as how much responsiveness is required in the fluid pressure actuator 10 and the diameter of the piston 102 described above.

Subsequently, by monitoring the time differential value of the addition value, the detection program determines that the negative variation start point P31 of the time differential value corresponds to the time point at which the piston 102 stops moving (time t4). In addition, by monitoring the time differential value of the subtraction value, the detection program determines that the push-direction moving of the piston 102 is completed based on that the time differential value of the subtraction value has already changed to a positive value at the timing of the negative variation start point P31. The display unit 56 displays that the piston 102 stops moving in the push direction at time t4. Further, when the time period from time t3 to time t4 is calculated in addition to detecting the motion of the piston 102, it is possible to judge if the operation of the fluid pressure actuator 10 is abnormal based on the length of the calculated time period. For example, if the calculated time period is longer than a predetermined threshold value (provided as a third threshold value), indicating that the operating speed of the fluid pressure actuator 10 is decreased due to deteriorated sliding property of the piston 102 and other reasons, the operation of the fluid pressure actuator 10 can be judged to be abnormal. If the fluid pressure actuator 10 is determined to be operating abnormally, the display unit 56 may display to that effect. The third threshold value is appropriately set for example according to parameters, such as how much operating speed is required for the fluid pressure actuator 10 and the diameter of the piston 102 described above.

After the fluid pressure actuator 10 completes the push-direction operation as above, the controller 2 applies an electric signal to the second solenoid 134B of the changeover valve 13 at time t5. The operation detecting device 5 detects this timing at which the electric signal is applied to the second solenoid 134B, via the digital signal input unit 53.

Subsequently, by monitoring the time differential value of the addition value, the detection program determines that the positive variation start point P12 of the time differential value corresponds to the time point at which air supply is switched by the changeover valve 13 (time t6). When the time period from time t5 to time t6 is calculated at the same time as the above determination, it is possible to judge if the operation of the changeover valve 13 is abnormal based on the length of the calculated time period. For example, if the calculated time period is longer than a predetermined threshold value (provided in the same way as for the first threshold value), the operation of the changeover valve 13 can be judged to be abnormal. If the changeover valve 13 is determined to be operating abnormally, the display unit 56 may display to that effect.

Subsequently, by monitoring the time differential value of the addition value, the detection program determines that the convergence time point P22 of the time differential value corresponds to the start time at which the piston 102 starts to move (time t7). In addition, by monitoring the time differential value of the subtraction value, the detection program determines that the moving direction of the piston 102 corresponds to the pull direction based on that the time differential value of the subtraction value has already changed to a negative value at the timing of the convergence time point P22. The display unit 56 displays that the piston 102 starts to move at time t7 and the moving direction is the pull direction. Further, when time period from time t6 to time t7 is calculated in addition to detecting the motion of the piston 102, it is possible to judge if the operation of the fluid pressure actuator 10 is abnormal based on the length of the calculated time period. For example, if the calculated time period is longer than a predetermined threshold value (provided in the same way as for the second threshold value), the fluid pressure actuator 10 can be judged to be abnormal. If the fluid pressure actuator 10 is determined to be operating abnormally, the display unit 56 may display to that effect.

Subsequently, by monitoring the time differential value of the addition value, the detection program determines that the negative variation start point P32 of the time differential value is the stop time at which the piston 102 stops moving (time t8). In addition, by monitoring the time differential value of the subtraction value, the detection program determines that the pull-direction movement of the piston 102 is completed based on that the time differential value of the subtraction value has already changed to a negative value at the timing of the negative variation start point P32. The display unit 56 displays that the piston 102 stops moving in the pull direction at time t8. Further, when the time period from time t7 to time t8 is calculated in addition to detecting the motion of the piston 102, it is possible to judge if the operation of the fluid pressure actuator 10 is abnormal based on the length of the calculated time period. For example, if the calculated time period is longer than a predetermined threshold value (provided in the same way as for the third threshold value, the operation of the fluid pressure actuator 10 can be judged to be abnormal. If the fluid pressure actuator 10 is determined to be operating abnormally, the display unit 56 may display to that effect.

The fluid pressure actuator 10 is configured to repeat the push operation and the pull operation and accordingly, the operations from time t1 to time 8 are repeated after time t9 in FIG. 8.

(1) As described above, the operation detecting system 1 for the fluid pressure actuator 10, which is provided with the double-acting cylinder 101 having the piston 102 and the interior divided by the piston 102 into the first chamber 103 and the second chamber 104, and is configured to switch the moving direction of the piston 102 by switching between supply of operation air to the first chamber 103 and supply of operation air to the second chamber 104, is configured to detect the start time and the stop time of the movement of the piston 102. This system 1 includes a first pressure detecting unit (e.g., the first pressure sensor 3) that detects a first pressure value, which is the pressure value in the first chamber 103, a second pressure detecting unit (e.g., the second pressure sensor 4) that detects a second pressure value, which is the pressure value in the second chamber 104, and a detecting unit (e.g., the operation detecting device 5) including a detection program that calculates an addition value of the first pressure value (the waveform W11) and the second pressure value (the waveform W21), calculates a time differential value of the addition value (the waveform A11), and detects the start time (time t3, time t7) and the stop time (time t4 and time t8) based on a variation in the time differential value (the waveform D11) over time.

(2) In the operation detecting system 1 for the fluid pressure actuator 10 described in (1), the detection program may be configured to determine that the time point at which the time differential value (the waveform D11) having started changing from nearly zero to a positive value converges again to nearly zero (e.g., the convergence time point P21, P22) is the start value (time t3, time t7).

(3) In the operation detecting system 1 for the fluid pressure actuator 10 described in (1) or (2), the detection program may be configured to determine that the time point at which the time differential value (the waveform D11) starts to change from nearly zero to a negative value is the stop time (time t4, time t8).

(4) In the operation detecting system 1 for the fluid pressure actuator 10 described in any one of (1) to (3), the detection program may be configured to determine that the time point at which the time differential value (the waveform D11) starts to change (the positive variation start point P11, P12) is a time point at which the supply of operation air to the first chamber 103 and the supply of operation air to the second chamber 104 are switched over (time t2, time t6).

In the fluid pressure actuator 10, the moving direction of the piston 102 is switched between the push direction and the pull direction by switching between the supply of operation air to the first chamber 103 and the supply of operation air to the second chamber 104. For this actuator 10, the inventor has found out that the start time and the stop time of movement of the piston 102 can be accurately detected by time-differentiating a value calculated by adding up the first pressure value which is a pressure value in the first chamber 103 and the second pressure value which is a pressure value in the second chamber 104, regardless of the piston moving direction, and monitoring a variation in the time-differentiated value over time. Hereinafter, the value obtained by time differentiation of the addition value, which is the sum of the first and second pressure values, is referred to as a "time differential value of the addition value", and the variation over time in the time differential value of the addition value is referred to as a "variation in the time differential value of the addition value".

For example, the inventor found out that the time point at which the time differential value of an addition value (the waveform D11), which has started varying from nearly zero to a positive value, converges again to nearly zero (which is referred to as the convergence time point P21 or the convergence time point P22) coincides with the start time of movement of the piston 102 (time t3 or time t7). Thus, by monitoring the variation in the time differential value of the addition value (the waveform D11), it is possible to accurately determine that the convergence time point P21 or convergence time point P22 is the start time of movement of the piston 102 (time t3 or time t7).

Further, for example, the inventor found that the time point at which the time differential value of an addition value (the waveform D11) starts to vary from nearly zero to a negative value (which is referred to as the negative variation start point P31 or negative variation start point P32) coincides with the stop time of movement of the piston 102 (time t4 or time t8). Thus, by monitoring the variation in the time differential value of the addition value (the waveform D11), it is possible to accurately determine that the negative variation start point P31 or negative variation start point P32 is the stop time of movement of the piston 102 (time t4 or time t8).

In addition, for example, the inventor found that the time point at which the time differential value of an addition value (the waveform D11) starts to vary from nearly zero to a positive value (which is referred to as the positive variation start point P11 or positive variation start point P12) coincides with the time point of switching between the supply of operation air to the first chamber 103 and the supply of operation air to the second chamber 104 (time t2 or time t6). Thus, by monitoring the variation in the time differential value of the addition value (the waveform D11), it is possible to accurately determine that the positive variation start point P11 or the positive variation start point P12 is the time point of switching air supply (time t2 or time t6). The switching of air supply is performed to change the moving direction of the piston 102 of the fluid pressure actuator 10 from the push direction to the pull direction or from the pull direction to the push direction. In the fluid pressure actuator 10 provided with the operating rod 105 connected to the piston 102, the push direction indicates the direction in which the operating rod 105 is projected from the double-acting cylinder 101. The pull direction indicates the direction in which the operating rod 105 is retracted into the double-acting cylinder 101, opposite the push direction.

(5) In the operation detecting system 1 for the fluid pressure actuator 10, described in any one of (1) to (4), the detection program may be configured to calculate a subtraction value between the first and second pressure values, calculate a time differential value of the subtraction value (the waveform S11), and detect the moving direction of the piston 102 based on a variation in the time differential value (the waveform D21) over time.

(6) In the operation detecting system 1 for the fluid pressure actuator 10, described in (5), the detection program may be configured to detect the moving direction of the piston 102 at the time when detecting the variation in the time differential value of the addition value.

In the variation in the time differential value of the addition value (the waveform D11), described in the above-mentioned configurations (1) to (4), regardless of whether the fluid pressure actuator 10 operates in the push direction or in the pull direction, the convergence time point P21 after the positive variation start point P11 and the convergence time point P22 after the positive variation start point P12 are each the start time at which the piston 102 starts to move (time t3, time t7), and the negative variation start point P31 and the negative variation start point P32 are each the stop time at which the piston 102 stops moving (time t4, time t8). Therefore, it is difficult to determine whether the fluid pressure actuator 10 is operating in the push direction or in the pull direction only by monitoring the variation in the time differential value of the addition value (the waveform D11). Under such circumstances, the inventor found out that whether the fluid pressure actuator 10 is operating in the push direction or the pull direction could be discriminated by subtracting between the first and second pressure values, time-differentiating a value obtained by the subtraction (the waveform S11), and monitoring a variation over time in a value (the waveform D21) obtained by the time differentiation. The value obtained by the time differentiation of the value calculated by the subtraction between the first and second pressure values is referred to as a "time differential value of the subtraction value" and the variation over time in the time differential value of the subtraction value is referred to as a "variation in the time differential value of the subtraction value".

For example, the inventor found out that when the fluid pressure actuator 10 operates in the push direction, the time differential value of the subtraction value (the waveform D21) changes from nearly zero to a positive value at the time point of switching air supply (time t2) and the stop time (time t4) of movement of the piston 102. Further, the inventor found out that the time differential value of the subtraction value (the waveform D21) changes from nearly zero to a negative value the time point of switching air supply (time t6) and the stop time (time t8) of movement of the piston 102.

Therefore, by monitoring the variation in the time differential value of the subtraction value (the waveform D21) in combination with monitoring the variation in the time differential value of the addition value (the waveform D11), it is possible to determine whether the fluid pressure actuator 10 starts operating in the push direction or in the pull direction based on whether the time differential value of the subtraction value (the waveform D21) has already changed to a positive value or to a negative value at the timing of each of the convergence time point P21 and the convergence time point P22 of the variation in the time differential value of the addition value (the waveform D11). In addition, it is possible to determine whether the fluid pressure actuator 10 completes the operation in the push direction or in the pull direction based on whether the time differential value of the subtraction value (the waveform D21) changes to a positive value or a negative value at the timing of each of the negative variation start point P31 and the negative variation start point P32 of the variation in the time differential value of the addition value (the waveform D11).

The foregoing embodiments are mere examples and give no limitation to the present disclosure. The present disclosure may be embodied in other specific forms without departing from the essential characteristics thereof. For instance, the operation detecting device 5 may be configured to monitor the operating states of multiple fluid pressure actuators 10. The pressure sensors 3 and 4 in the foregoing embodiment are placed on the first pipe 11 and the second pipe 12 respectively, but not limited thereto and may be installed inside the operation detecting device 5. As other alternatives, the fluid pressure actuator 10 does not necessarily have to include the operating rod 105, and the disclosure may be applied to any actuators with double-acting cylinders, such as parallel hands.

REFERENCE SIGNS LIST

1 Operation detecting system
3 First pressure sensor (One example of a first pressure detecting unit)
4 Second pressure sensor (One example of a second pressure detecting unit)
5 Operation detecting device (One example of a detecting unit)
10 Fluid pressure actuator
101 Double-acting cylinder
102 Piston
103 First pressure acting chamber
104 Second pressure acting chamber

What is claimed is:

1. A system for detecting operation of a fluid pressure actuator, the fluid pressure actuator being provided with a double-acting cylinder having a piston and an interior divided by the piston into a first pressure acting chamber and a second pressure acting chamber, the fluid pressure actuator being configured to switch a moving direction of the piston by switching between supply of operation air to the first pressure acting chamber and supply of operation air to the second pressure acting chamber, wherein the system is configured to detect a start time at which the piston starts to move and a stop time at which the piston stops moving, wherein the system comprises:

a first pressure detecting unit configured to detect a first pressure value representing a pressure value in the first pressure acting chamber;

a second pressure detecting unit configured to detect a second pressure value representing a pressure value in the second pressure acting chamber; and a detecting unit including a detection program configured to calculate an addition value of the first pressure value and the second pressure value, calculate a time differential value of the addition value, and detect the start time and the stop time based on a variation in the time differential value over time.

2. The system for detecting operation of a fluid pressure actuator according to claim 1, wherein the detection program is configured to determine that a time point at which the time differential value having started changing from nearly zero to a positive value converges again to nearly zero is the start time.

3. The system for detecting operation of a fluid pressure actuator according to claim 2, wherein the detection program is configured to determine that a time point at which the time differential value starts to change from nearly zero to a negative value is the stop time.

4. The system for detecting operation of a fluid pressure actuator according to claim 3, wherein the detection program is configured to determine that a time point at which the time differential value starts to change from nearly zero to a positive value is a time point at which the supply of operation air to the first pressure acting chamber and the supply of operation air to the second pressure acting chamber are switched over.

5. The system for detecting operation of a fluid pressure actuator according to claim 2, wherein the detection program is configured to determine that a time point at which the time differential value starts to change from nearly zero to a positive value is a time point at which the supply of operation air to the first pressure acting chamber and the supply of operation air to the second pressure acting chamber are switched over.

6. The system for detecting operation of a fluid pressure actuator according to claim 2, wherein the detection program is configured to calculate a subtraction value between the first pressure value and the second pressure value, calculate a time differential value of the subtraction value, and detect the moving direction of the piston based on a variation in the time differential value over time.

7. The system for detecting operation of a fluid pressure actuator according to claim 6, wherein the detection program is configured to detect the moving direction of the piston at the time when detecting the variation in the time differential value of the addition value.

8. The system for detecting operation of a fluid pressure actuator according to claim 1, wherein the detection program is configured to determine that a time point at which the time differential value starts to change from nearly zero to a negative value is the stop time.

9. The system for detecting operation of a fluid pressure actuator according to claim 8, wherein the detection program is configured to determine that a time point at which the time differential value starts to change from nearly zero to a positive value is a time point at which the supply of operation air to the first pressure acting chamber and the supply of operation air to the second pressure acting chamber are switched over.

10. The system for detecting operation of a fluid pressure actuator according to claim 1, wherein the detection program is configured to determine that a time point at which the time differential value starts to change from nearly zero to a positive value is a time point at which the supply of operation air to the first pressure acting chamber and the supply of operation air to the second pressure acting chamber are switched over.

11. The system for detecting operation of a fluid pressure actuator according to claim 1, wherein the detection program is configured to calculate a subtraction value between the first pressure value and the second pressure value, calculate a time differential value of the subtraction value, and detect the moving direction of the piston based on a variation in the time differential value over time.

12. The system for detecting operation of a fluid pressure actuator according to claim 11, wherein the detection program is configured to detect the moving direction of the piston at the time when detecting the variation in the time differential value of the addition value.

* * * * *